US010415991B2

(12) United States Patent
Masuda et al.

(10) Patent No.: US 10,415,991 B2
(45) Date of Patent: Sep. 17, 2019

(54) INFORMATION PROCESSING SYSTEM AND INFORMATION PROCESSING METHOD (71) Applicant: HONDA MOTOR CO., LTD., Tokyo (JP)

(72) Inventors: Takuro Masuda, Tokyo (JP); Takamichi Shimada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 166 days.

(21) Appl. No.: 15/725,529

(22) Filed: Oct. 5, 2017

(65) Prior Publication Data
US 2018/0180440 A1 Jun. 28, 2018

(30) Foreign Application Priority Data
Dec. 28, 2016 (JP) ................... 2016-256550

(51) Int. Cl.
G01C 21/36 (2006.01)
G01W 1/10 (2006.01)
G01C 21/34 (2006.01)
G01P 3/00 (2006.01)
G01W 1/18 (2006.01)

(52) U.S. Cl.
CPC ..... *G01C 21/3694* (2013.01); *G01C 21/3453* (2013.01); *G01C 21/3461* (2013.01); *G01C 21/3688* (2013.01); *G01P 3/00* (2013.01); *G01W 1/10* (2013.01); *G01W 1/18* (2013.01); *G01C 21/3697* (2013.01)

(58) Field of Classification Search
CPC ........... G01C 21/3694; G01C 21/3453; G01C 21/3461; G01C 21/3688; G01C 21/3697; G01P 3/00; G01W 1/10; G01W 1/18
See application file for complete search history.

(56) References Cited

U.S. PATENT DOCUMENTS

| 9,417,074 B2* | 8/2016 | Leader ................. G01C 21/20 |
| 2006/0217879 A1* | 9/2006 | Ikeuchi ................. G01C 21/32 |
| | | 701/409 |
| 2014/0002277 A1* | 1/2014 | Fulger ................. G01C 21/3415 |
| | | 340/905 |
| 2018/0004211 A1* | 1/2018 | Grimm ............... G01C 21/3407 |
| 2018/0039284 A1* | 2/2018 | Hitosugi ................ B62D 6/001 |

FOREIGN PATENT DOCUMENTS

| JP | 2012-008047 A | 1/2012 |
| JP | 2012-177673 A | 9/2012 |

* cited by examiner

Primary Examiner — Calvin Cheung
(74) Attorney, Agent, or Firm — Squire Patton Boggs (US) LLP (57) ABSTRACT An information processing system includes: an acquisition unit configured to acquires position information indicating a position of a vehicle, sensor performance information indicating the performance of a sensor mounted on the vehicle, and weather information corresponding to the position of the vehicle; and a database creation unit configured to creates correlation data indicating a correlation between the weather information and the sensor performance information on the basis of the information acquired by the acquisition unit.

11 Claims, 5 Drawing Sheets

INFORMATION PROCESSING SYSTEM AND INFORMATION PROCESSING METHOD

CROSS-REFERENCE TO RELATED APPLICATION

This application is based upon and claims the benefit of priority from Japanese patent application No. 2016-256550, filed on Dec. 28, 2016, the content of which is incorporated herein in its entirety by reference.

BACKGROUND OF THE INVENTION

Field of the Invention

The present invention relates to an information processing system and an information processing method.

Description of Related Art

Conventionally, a system in which network data defined by a traffic network and expected rainfall information in each of regions and each of time periods are stored so that users can immediately ascertain the amount of rainfall that will be encountered, a guidance route from a departure place to a destination satisfying route search conditions is acquired, the amount of rainfall in the route is calculated, and the calculation result is correlated with the guidance route to create rainfall guide information, and the guide information is displayed is known (see Japanese Unexamined Patent Application, First Publication No. 2012-8047).

Moreover, a system in which a navigation control unit extracts a parking lot that satisfies predetermined conditions among a plurality of parking lots on the basis of parking lot information distributed by DSRC, acquires at least one item of snow related information among snowfall, accumulation of snow, removal or snow, and melting of snow on the parking lot, and displays the snow related information and the parking lot information in correlation is known (see Japanese Unexamined Patent Application, First Publication No. 2012-177673).

SUMMARY OF THE INVENTION

However, when safety measures such as deceleration are performed because the performance of a sensor mounted on a vehicle has deteriorated in an environment such as snow, rain, and the like, decelerating the vehicle to a speed lower than necessary may be inconvenient to users.

With the foregoing in view, one of the objects of the present invention is to provide an information processing system and an information processing method capable of providing information that enables comfortable driving even bad weather conditions in bad weather conditions.

In order to attain the object, the present invention employs the following aspects.

(1) An information processing system according to an aspect of the present invention includes: an acquisition unit configured to acquire position information indicating a position of a vehicle, sensor performance information indicating the performance of a sensor mounted on the vehicle, and weather information corresponding to the position of the vehicle; and a database creation unit configured to create correlation data indicating a correlation between the weather information and the sensor performance information on the basis of the information acquired by the acquisition unit.

(2) In the information processing system according to aspect (1), the correlation data may be at least data indicating a correlation between weather information that satisfies a performance deterioration weather condition determined in advance as a weather condition for which deterioration in the performance of the sensor is predicted and sensor performance information corresponding to weather that satisfies the performance deterioration weather condition.

(3) The information processing system according to aspect (1) or (2) may further include: a route generation unit configured to generate a route to a destination; and a guidance information generation unit configured to generate guidance information corresponding to the performance of the sensor by referring to the correlation data on the basis of the weather information on the route generated by the route generation unit when a place that satisfies a performance deterioration weather condition determined in advance as a weather condition for which deterioration in the performance of the sensor is predicted is present on the route generated by the route generation unit.

(4) An information processing system according to an aspect of the present invention includes: an acquisition unit configured to acquire position information indicating a position of a vehicle, vehicle speed information detected by a sensor mounted on the vehicle, and weather information corresponding to the position of the vehicle; and a database creation unit configured to create correlation data indicating a correlation between the weather information and information based on the vehicle speed information on the basis of the information acquired by the acquisition unit.

(5) In the information processing system according to aspect (4), the correlation data may be at least data indicating a correlation between weather information that satisfies a performance deterioration weather condition determined in advance as a weather condition for which deterioration in the performance of the sensor is predicted and information based on a vehicle speed corresponding to weather that satisfies the performance deterioration weather condition.

(6) In the information processing system according to aspect (5), the acquisition unit may further acquire sensor performance information indicating the performance of the sensor mounted on the vehicle, and the database creation unit may determine sensor performance information that satisfies a predetermined reference condition as reference sensor performance information within the sensor performance information acquired by the acquisition unit and create the correlation data by learning a correlation between the weather condition and the vehicle speed information detected when sensor performance information of which the performance of the sensor is lower than the reference sensor performance information is acquired.

(7) The information processing system according to any one of aspects (4) to (6) may further include: a route generation unit configured to generate a route to a destination; and a guidance information generation unit configured to generate guidance information including a recommended speed on the route by referring to the correlation data on the basis of the weather information on the route generated by the route generation unit when a place that satisfies a performance deterioration weather condition determined in advance as a weather condition for which deterioration in the performance of the sensor is predicted is present on the route generated by the route generation unit.

(8) The information processing system according to aspect (3) or (7) may further include: a display control unit configured to generate an image to be displayed on a display unit on the basis of the guidance information created by the guidance information generation unit and cause the generated image to be displayed on the display unit.

(9) In the information processing system according to aspect (8), the display control unit may cause the generated image to be displayed on a display unit provided in the vehicle or a display unit of a mobile terminal.

(10) An information processing method according to an aspect of the present invention causes a computer to execute: acquiring position information indicating a position of a vehicle, sensor performance information indicating the performance of a sensor mounted on the vehicle, and weather information corresponding to the position of the vehicle; and creating correlation data indicating a correlation between the weather information and the sensor performance information on the basis of the acquired information.

(11) An information processing method according to an aspect of the present invention causes a computer to execute: acquiring position information indicating a position of a vehicle, vehicle speed information detected by a sensor mounted on the vehicle, and weather information corresponding to the position of the vehicle; and creating correlation data indicating a correlation between the weather information and information based on the vehicle speed information on the basis of the acquired information.

According to aspects (1), (2), (4), (5), (10), and (11), it is possible to provide information that enables comfortable driving even under bad weather conditions.

According to aspect (3), it is possible to create guidance information that reflects the sensor performance under bad weather conditions.

According to aspect (6), it is possible to create correlation data on the basis of information such as sensor performance information detected when the deterioration in the sensor performance is caused by a bad weather such as heavy rain or heavy snow.

According to aspect (7), it is possible to create guidance information that reflects the vehicle speed under bad weather conditions.

According to aspects (8) and (9), it is possible to provide information that enables comfortable driving to users even under bad weather conditions.

DETAILED DESCRIPTION OF THE INVENTION

Hereinafter, an embodiment of an information providing system and an information processing method according to the present invention will be described with reference to the drawings.

Figure 1:
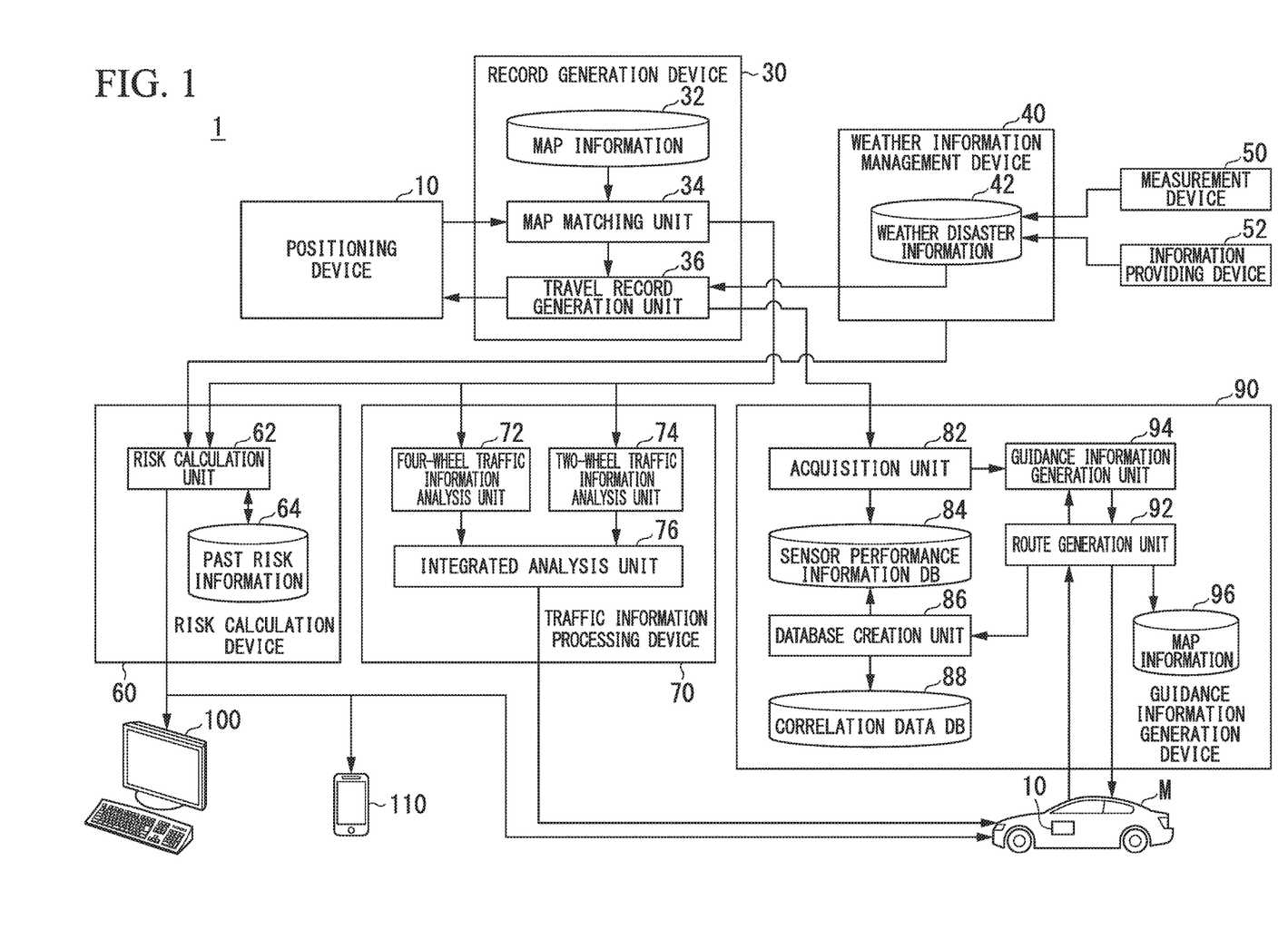
FIG. 1 is a diagram illustrating a functional configuration of an information processing system 1.

FIG. 1 is a diagram illustrating a functional configuration of an information processing system 1. For example, the information processing system 1 includes a positioning device 10, a record generation device 30, a weather information management device 40, a measurement device 50, an information providing device 52, a risk calculation device 60, a traffic information processing device 70, and a guidance information generation device 90. These devices communicate with each other via a network NW such as a local area network (LAN), a wide area network (WAN), a cellular network, a Wi-Fi network, or the Internet. The information processing system 1 may include a plurality of positioning devices 10.

The positioning device 10 may be mounted on a four-wheeled vehicle or a two-wheeled vehicle and may be brought in and may be carried by a driver.

Figure 2:
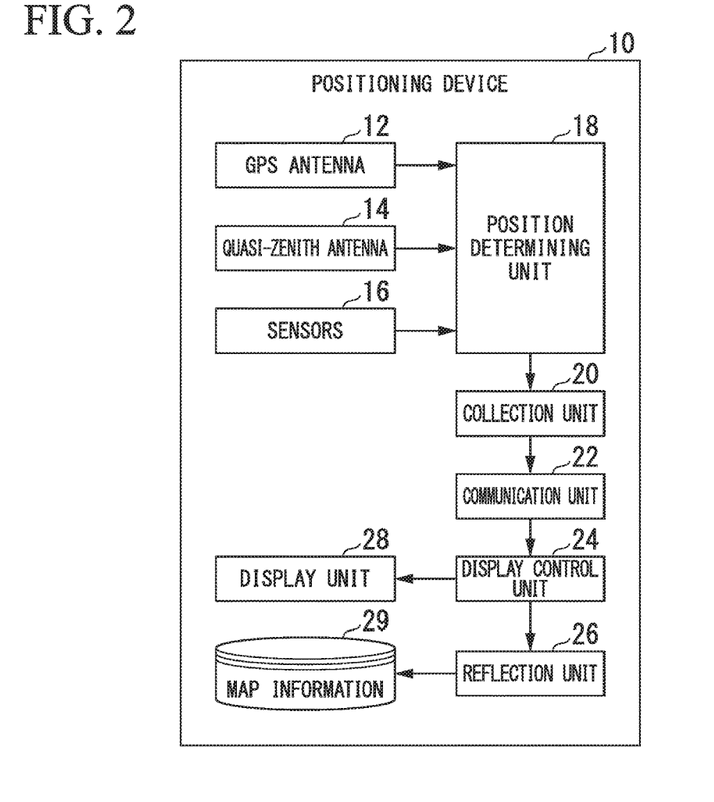
FIG. 2 is a diagram illustrating a functional configuration of a positioning device 10.

FIG. 2 is a diagram illustrating a functional configuration of the positioning device 10. The positioning device 10 is a device mounted on a two-wheeled vehicle or a four-wheeled vehicle, for example. The positioning device 10 includes a global positioning system (GPS) antenna 12, a quasi-zenith antenna 14, various sensors 16, a position determining unit 18, a collection unit 20, a communication unit 22, a display control unit 24, a reflection unit 26, a display unit 28, and map information 29, for example. The positioning device 10 may be a device that forms a part of a mobile terminal. In this case, when an occupant of the vehicle carries the mobile terminal having the positioning device 10 mounted thereon or brings the same into the vehicle, position information corresponding to the position information of the vehicle is transmitted to the record generation device 30. The detection values obtained by the sensors 16 may be acquired from the vehicle via the communication unit 22, and a device included in the mobile terminal may be a part of the sensors.

The display control unit 24 and the reflection unit 26 may be implemented when a processor such as a central processing unit (CPU) executes a program stored in a storage unit. Some or all of these functional units may be implemented by hardware such as a large scale integration (LSI), an application specific integrated circuit (ASIC), or a field-programmable gate array (FPGA) and may have a circuit configuration for implementing the functions of these functional units. Moreover, these functional units may be implemented by cooperation of software and hardware. The map information 29 is stored in a nonvolatile storage medium such as a flash memory or a hard disk drive (HDD), for example.

The GPS antenna 12 receives radio waves on which items of information (positioning information) transmitted from a plurality of GPS satellites are superimposed. The GPS antenna 12 may receive radio waves from a satellite that forms a global navigation satellite system (GNSS) such as GLONASS or Galileo without being limited to a GPS satellite.

The quasi-zenith antenna 14 receives radio waves on which items of information (positioning information and correction information to be described later) transmitted from one or more quasi-zenith satellites of a plurality of quasi-zenith satellites that form a quasi-zenith satellite system are superimposed. The quasi-zenith satellite system is a satellite system in which a plurality of satellites having orbits that pass through approximately the zenith (the top) of a certain region (for example, Japan) are combined. The quasi-zenith antenna 14 is more likely to be able to receive radio waves which are not affected by multipath delays due to high-rise buildings from the quasi-zenith satellites than the GPS antenna 12. The GPS antenna 12 and the quasi-zenith antenna 14 may be integrated.

The sensors 16 include an acceleration sensor, an azimuth sensor, a vehicle speed sensor, a steering angle sensor, a radar apparatus, a finder, a camera, and the like, for example. Each of the acceleration sensor, the azimuth sensor, the vehicle speed sensor, the steering angle sensor, the radar apparatus, the finder, the camera, and the like will be referred to as a sensor. The sensors 16 output information (hereinafter referred to as sensor performance information) indicating the performance of each sensor to the collection unit 20. The performance of the sensor is different depending on the type of the sensor. For example, the sensor performance is a visible range if the sensor is the radar apparatus and is the performance of recognizing a predetermined reference target (for example, the central line of a road) if the sensor is the camera.

The acceleration sensor is a 3-axis acceleration sensor, for example. The acceleration sensor detects acceleration of a vehicle and outputs the detection result to the position determining unit 18. The azimuth sensor measures a magnetic field to detect the orientation of the vehicle in relation to the earth and outputs the detection result to the position determining unit 18. The vehicle speed sensor includes a wheel speed sensor attached to each wheel and a controller that integrates these detection results. The vehicle speed sensor detects the speed of the vehicle and outputs the detection result to the position determining unit 18. The steering angle sensor detects the steering angle of a steering wheel and outputs the detection result to the position determining unit 18 or the collection unit 20.

The radar apparatus radiates radio waves such as millimeter waves toward the surroundings of the subject vehicle, detects radio waves (reflection waves) reflected from an object to detect at least the position (the distance and the azimuth) of the object and outputs the detection result to the position determining unit 18 or the collection unit 20. One or a plurality of the radar apparatuses are attached to arbitrary positions on the subject vehicle. The radar apparatus may detect the position and the speed of an object according to a frequency modulated continuous wave (FM-CW) method.

The finder is a LIDAR (light detection and ranging or laser imaging detection and ranging) that measures scattered light from irradiation light to detect the distance to an object and outputs the detection result to the position determining unit 18 or the collection unit 20. One or a plurality of the finders are attached to arbitrary positions on the subject vehicle.

The camera is a digital camera which uses a solid-state image capturing device such as a charge coupled device (CCD) or a complementary metal oxide semiconductor (CMOS), for example and outputs captured image data and setting conditions during capturing to the position determining unit 18 or the collection unit 20. One or a plurality of the cameras are attached to arbitrary positions on the vehicle on which the vehicle system 1 is mounted. When capturing an image of the side in front, the camera is attached to the upper part of the front window shield or the back surface of the room mirror. The camera captures images around the vehicle repeatedly and periodically, for example. The camera may be a stereo camera.

Some or all detection results of the camera, the radar apparatus, and the finder may be subjected to sensor fusion processing by an object recognition device mounted on the vehicle, for example, whereby the position, the type, the speed, and the like of the object are recognized.

The position determining unit 18 determines the position of the vehicle by performing a positioning operation of specifying the position of a subject device according to the principle of triangulation, for example, at predetermined sampling intervals on the basis of the radio waves in which items of information received by the GPS antenna 12 are superimposed and radio waves in which items of information received by the quasi-zenith antenna 14 are superimposed.

The positioning information includes satellite orbit information (ephemeris and almanac) on a corresponding satellite, a clock correction value, and an ionosphere correction coefficient. The correction information is information derived by a reference device which is an electronic reference point installed in advance at a predetermined position. This correction information is transmitted in advance from a facility on the ground to the quasi-zenith satellite. The reference device derives a geometric distance from the subject device to the quasi-zenith satellite (hereinafter a target satellite) on the basis of the position of the subject device and the position of the GPS satellite or the target satellite which are acquired in advance. Moreover, the reference device derives a pseudo distance between the subject device and the target satellite on the basis of a propagation time of the radio waves acquired from the target satellite. The reference device acquires the difference between the pseudo distance and the geometric distance as an error. The reference device transmits the error information to a ground station device. The ground station device derives a parameter of a function that derives an error in the pseudo distance for each coordinates point on the basis of the errors acquired from a plurality of reference devices and transmits the derived parameter of the function to the quasi-zenith satellite as correction information.

The position determining unit 18 derives a change in the position of the subject vehicle on the basis of the detection results of the sensors 16 or the like mounted on the vehicle. The position determining unit 18 may correct the position of the vehicle by performing a positioning operation on the basis of the derived positional change.

The collection unit 20 collects the position information determined by the position determining unit 18 and transmits the collected position information to the record generation device 30 using the communication unit 22 when a predetermined amount of position information is collected. Moreover, the collection unit 20 may collect the detection results and the sensor performance information of the sensors 16 and transmit the collected detection results and the sensor performance information to the record generation device 30. Moreover, the collection unit 20 may collect vehicle speed information sampled at predetermined periods and transmit the collected vehicle speed information to the record generation device 30. The information collected by the collection unit 20 is also referred to as probe information. In the present embodiment, the probe information includes position information, vehicle speed information, sensor performance information, and date information, for example. The probe information may further include braking distance information indicating the braking distance of a brake, wiper information indicating whether a wiper is used or not and the reciprocation speed of the wiper, and image data obtained by the capturing of the camera, for example.

The display control unit 24 generates information to be presented to a user on the basis of the information generated by the record generation device 30, the traffic information processing device 70, and the guidance information generation device 90 and causes the display unit 28 to display the generated information. The reflection unit 26 reflects the information transmitted by the record generation device 30, the traffic information processing device 70, and the guidance information generation device 90 in the map information 29.

The display unit 28 includes a display device such as a liquid crystal display (LCD), or an organic electroluminescence (EL) display, for example.

The map information 29 is information in which a road shape is represented by links indicating roads and nodes connected by the links, for example. The map information 29 may include the curvature of a road, a point of interest (POI) information, and the like. Moreover, the map information 29 includes road information such as information on the center of a lane or information on the boundary of a lane, for example. The road information includes information indicating the type of a road such as an expressway, a toll road, a national highway, or a public road, and the number of lanes on a road, the width of each lane, a slope of a road, the position (coordinates including the latitude and longitude) of a road, the curvature of a lane, and the positions of joining and branching points of lanes. The map information 29 is updated by the process of the reflection unit 26 as necessary.

The record generation device 30 includes map information 32, a map matching unit 34, and a travel record generation unit 36, for example. The map information 32 has information equivalent to the map information 29.

The map matching unit 34 executes a map matching process on the information acquired from the positioning device 10. The map matching unit 34 performs a map matching process of determining a link in which the positioning device 10 is present among the elements (for example, links) included in the map information 32 on the basis of the acquired position information and the map information 32. With this map matching process, a link and a lane on which the positioning device 10 is present among the links and the lanes included in the map information 32 are determined. Unique identification information (for example, a link ID) is allocated to each link.

The travel record generation unit 36 acquires the processing results of the map matching unit 34 and generates travel record information on the basis of the acquired information. The travel record information is information indicating the actual travel records (trajectories) of the vehicle on which the positioning device 10 is mounted. The travel record information includes the position information of the actual travel of the vehicle and information on the date at which the position information was acquired, a road link, and a road lane, for example. The travel record information is transmitted to the positioning device 10, the traffic information processing device 70, and the guidance information generation device 90 mounted on the vehicle. Moreover, the travel record generation unit 36 also transmits the vehicle speed information, the sensor performance information, and the date information included in the probe information to the guidance information generation device 90 together with the travel record information.

The weather information management device 40 includes weather disaster information 42, for example. Information on weather disasters correlated with each region is stored in the weather disaster information 42.

The measurement results (for example, the amount of rainfall or the amount of snowfall) of the measurement device 50 acquired from the measurement device 50 and information (for example, information on heavy rain or heavy snow) on the weather disasters acquired from the information providing device 52 are stored in the weather disaster information 42.

The measurement device 50 is a weather observatory device provided at a predetermined position, for example. The measurement device 50 observes the amount of rainfall, the amount of snowfall, the wind direction, the wind speed, the temperature, and the duration of sunshine, for example.

The information providing device 52 is a server device managed by a nation, a local government, or the like and provides weather information and disaster information to the weather information management device 40. The disaster information is information on natural disasters such as heavy rain, heavy snow, earthquakes, and the like, for example.

The risk calculation device 60 includes a risk calculation unit 62 and past risk information 64, for example. The risk calculation unit 62 derives the risk of occurrence of abnormalities on a road on the basis of the weather and disaster information acquired from the weather information management device 40 and the vehicle information acquired from the record generation device 30. An abnormality on the road is an abnormality that is inconvenient for the traveling of the vehicle, and for example, is flooding of a road such that a hydroplaning phenomenon occurs and freezing of a road surface. The past risk information 64 is information on risks calculated in the past by the risk calculation unit 62.

The traffic information processing device 70 includes a four-wheel traffic information analysis unit 72, a two-wheel traffic information analysis unit 74, and the integrated analysis unit 76, for example. The four-wheel traffic information analysis unit 72 acquires information on four-wheeled vehicles acquired by the record generation device 30 and analyzes the acquired information on the four-wheeled vehicles. The two-wheel traffic information analysis unit 74 acquires information on two-wheeled vehicles acquired by the record generation device 30 and analyzes the acquired information on the two-wheel vehicles. The integrated analysis unit 76 generates traffic information on the basis of the acquired information on four-wheeled vehicles and two-wheeled vehicles. The traffic information is information indicating the degree of congestion in a predetermined segment of a road, for example.

The guidance information generation device 90 includes an acquisition unit 82, a sensor performance information DB 84, a database creation unit 86, a correlation data DB 88, a route generation unit 92, a guidance information generation unit 94, and map information 96, for example.

The acquisition unit 82 receives the travel record information, the vehicle speed information, the sensor performance information, and the date information from the record generation device 30 and stores the received items of information in the sensor performance information DB 84 in correlation with each other. Moreover, the acquisition unit 82 reads a portion of the weather disaster information 42 from the weather information management device 40 and stores the read weather disaster information in the sensor performance information DB 84. Here, the acquisition unit 82 acquires weather disaster information of a region including a point indicated by the travel record information from the weather information management device 40, the weather disaster information being acquired on the date indicated by the date information received from the record generation device 30, and writes the acquired weather disaster information in the sensor performance information DB 84 in correlation with the information received from the record generation device 30.

Figure 3:
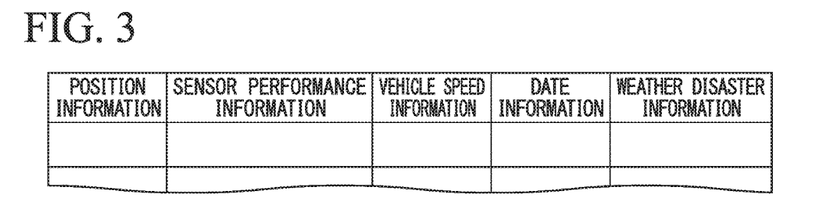
FIG. 3 is a diagram illustrating an example of a sensor performance information DB 84.

The sensor performance information DB 84 is a table in which items of information associated with the sensor performance information are correlated as illustrated in FIG. 3, for example. FIG. 3 is a diagram illustrating an example of the sensor performance information DB 84. As illustrated in FIG. 3, the sensor performance information DB 84 is a table in which position information, sensor performance information, vehicle speed information, date information, and weather disaster information are correlated, for example. The position information is information based on the travel record information and indicates the position at which the sensor performance information is detected and is represented by a link ID, for example. The vehicle speed information in this stage is the speed of the vehicle when the sensor performance information was detected. The weather disaster information is weather disaster information corresponding to the date on which the sensor performance information was detected and a place where the positioning device 10 (that is, the vehicle) having detected the sensor performance information was present.

The database creation unit 86 creates correlation data indicating at least one of a correlation (hereinafter referred to as correlation A) between the weather information and the sensor performance information and a correlation (hereinafter referred to as correlation B) between the weather information and the vehicle speed information on the basis of the information acquired by the acquisition unit 82. Moreover, the database creation unit 86 may create correlation data indicating a correlation with the weather information, the sensor performance information, and the vehicle speed information.

For example, the correlation data indicating the correlation A is data indicating at least the correlation between weather information that satisfies a weather condition (hereinafter referred to as a performance deterioration weather condition) determined in advance as a weather condition for which deterioration in the performance of the sensor is predicted and sensor performance information corresponding to the weather that satisfies the performance deterioration weather condition. The "performance deterioration weather condition" includes a weather condition that the amount of rainfall is equal to or larger than a threshold and a weather condition that the amount of snowfall is equal to or larger than a threshold. In the correlation data, the sensor performance information may be the sensor performance information itself and may be information obtained by classifying the sensor performance information into a predetermined range of classes.

For example, the correlation data indicating the correlation B is data indicating at least the correlation between weather disaster information that satisfies a performance deterioration weather condition and information based on a vehicle speed corresponding to a weather that satisfies the performance deterioration weather condition. The "information based on the vehicle speed" is drive control information derived on the basis of the vehicle speed information, and for example, may be a value indicated by the vehicle speed information, and may be an average value of a plurality of values, and may be a rounded-off value of these values. The drive control information is a recommended speed notified via audio or an image to the driver of the vehicle, for example.

For example, the database creation unit 86 retrieves weather disaster information that satisfies the performance deterioration weather condition from the sensor performance information DB 84, reads the weather disaster information obtained by the retrieval and the position information, the sensor performance information, and the vehicle speed information correlated with the weather disaster information, and creates the correlation data on the basis of the read information.

Moreover, the database creation unit 86 may acquire sensor performance information that satisfies a predetermined reference condition from the sensor performance information DB 84 to determine reference sensor performance information and create correlation data by learning the correlation between the weather condition and the sensor performance information (or the vehicle speed information detected when the sensor performance information was acquired) of which the sensor performance has deteriorated as compared to the reference sensor performance information. The "reference condition" is sensor performance information detected under a weather condition (for example, fair weather) in which the sensor performance rarely deteriorates, for example. In this way, it is possible to create correlation data on the basis of information such as sensor performance information detected when the deterioration in the sensor performance is caused by bad weather such as heavy rain or heavy snow. Moreover, when the cause of the deterioration in the sensor performance is a high-rise building or the like, even if the sensor performance information indicates a deterioration in performance, the sensor performance information is not reflected in the correlation data.

When creating the correlation data, the database creation unit 86 may apply the performance deterioration weather condition to a predetermined class and analyze the relation between the sensor performance information and the vehicle speed information for each class. The classes of the performance deterioration weather condition may be determined such that the amount of rainfall of 100 mm to 200 mm belongs to "class 1," the amount of rainfall of 200 mm to 300 mm belongs to "class 2," and so on. These classes may be determined on the basis of the amount of snowfall, the density of fog, or the like as well as the amount of rainfall.

In this way, it is possible to broaden the weather conditions to be registered in the correlation data.

Figure 4:
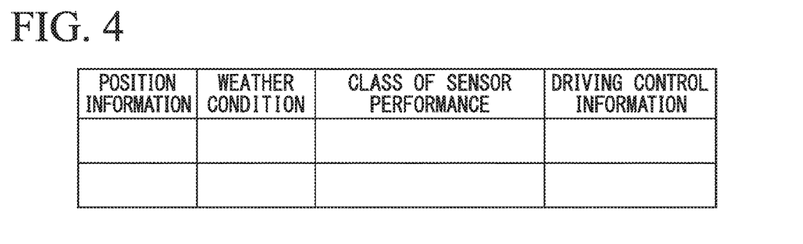
FIG. 4 is a diagram illustrating an example of a correlation data DB 88.

The correlation data DB 88 is correlation data created by the database creation unit 86. An example of the correlation data DB 88 is illustrated in FIG. 4. FIG. 4 is a diagram illustrating an example of the correlation data DB 88. As illustrated in FIG. 4, the correlation data DB 88 is a table in which position information, weather conditions, the class of the sensor performance, and the drive control information are correlated. The class of the sensor performance is a class applied by the database creation unit 86. The drive control information is a recommended speed or the like generated by the database creation unit 86.

The route generation unit 92 generates a route to a destination on the basis of travel plan information by referring to the map information 96 in response to a request from a user. The travel plan information includes the position information indicating a departure place, the position information indicating a destination, a departure time, and the like, for example. Moreover, the travel plan information may include a priority condition when a plurality of routes are retrieved and information indicating moving means. The map information 96 is the same data as the map information 29.

The guidance information generation unit 94 generates guidance information which is information output to a user when the vehicle travels along the route generated by the route generation unit 92 and which guides the vehicle so that the vehicle can travel along the generated route smoothly. The guidance information includes guide information for guiding the way in order to allow the vehicle to travel along the route, an arrival time when the vehicle travels along the route at the legal limit speed, for example, and a preferable recommended speed for travelling along the route.

The guidance information generation unit 94 may acquire the weather disaster information on the route generated by the route generation unit 92 from the weather disaster information 42 and generate guidance information corresponding to the sensor performance on the basis of the acquired weather disaster information when it is determined that a place where the sensor performance is lower than a predetermined level is present on the route by referring to the correlation data DB 88. That is, when the sensor performance is lower than the predetermined level, the guidance information generation unit 94 generates guidance information different from that when the sensor performance is not deteriorated.

Here, when it is determined that a place where the sensor performance is lower than a predetermined level is present on the route by referring to the correlation data DB 88 indicating the correlation A, the guidance information generation unit 94 acquires a predetermined recommended speed according to the sensor performance by referring to a predetermined table in which the sensor performance information and the recommended speed are correlated, for example. On the other hand, when referring to the correlation data DB 88 indicating the correlation B, the guidance information generation unit 94 acquires a recommended speed (drive control information) corresponding to the weather condition from the correlation data DB 88. The guidance information generation unit 94 derives an arrival time when the vehicle travels along the route at the recommended speed and other guidance information on the basis of the acquired recommended speed. The recommended speed, the arrival time, and the other guidance information acquired herein will be referred to as a vehicle control change plan.

When it is determined that a place where the sensor performance is lower than a predetermined level is present on the route, the guidance information generation unit 94 may request the route generation unit 92 to generate a route (for example, a route that bypasses a heavy rain region or a heavy snow region) that passes through regions where the sensor performance is not likely to be affected. In this case, the guidance information generation unit 94 may derive an arrival time when the vehicle travels along the bypass route generated by the route generation unit 92. When the arrival time of the initial route (that is, a route in which a place where the sensor performance is lower than a predetermined level is present on the route) is later than the arrival time of a bypass route, the guidance information generation unit 94 may generate guide information for guiding a change to the bypass route. The guidance information generation unit 94 may generate guidance information for the bypass route when a change of the route is instructed by the driver of the vehicle. The arrival time, the guide information, and the like when the vehicle travels along the acquired bypass route are also included in the vehicle control change plan.

The route to the destination and the guidance information generated by the guidance information generation unit 94 and the guide information to the bypass route are transmitted to the vehicle that has transmitted the request. A navigation device mounted on the vehicle having transmitted the request displays an image on a display unit and outputs audio from a speaker according to the traveling position and the traveling state of the vehicle. The information acquired by the respective devices of the information processing system 1, the processing procedures of the devices, and the processing results may be transmitted to a management terminal 100 that manages the system or the mobile terminal 110.

Figure 5:
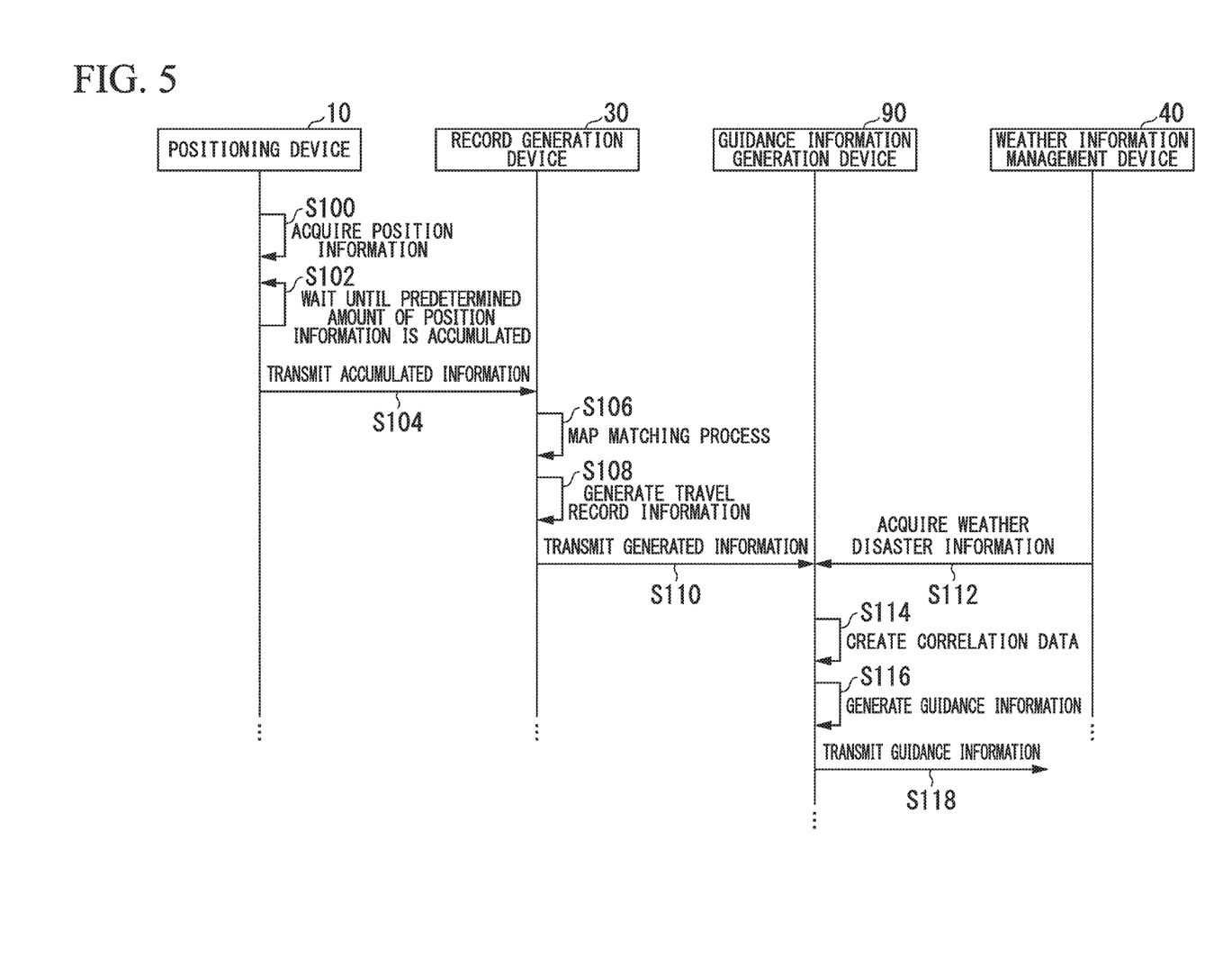
FIG. 5 is a sequence diagram illustrating processes executed by the information processing system 1.

Next, an example of processes executed by the information processing system 1 will be described with reference to FIG. 5. FIG. 5 is a sequence diagram illustrating processes executed by the information processing system 1. First, the position determining unit 18 of the positioning device 10 acquires the position information of the subject device (step S100). Subsequently, the collection unit 20 of the positioning device 10 waits until a predetermined amount of position information is accumulated in a storage device (not illustrated) of the subject device (step S102). Subsequently, the collection unit 20 of the positioning device 10 transmits the accumulated information to the record generation device 30 using the communication unit 22 (step S104).

Subsequently, the map matching unit 34 of the record generation device 30 executes a map matching process (step S106). Subsequently, the travel record generation unit 36 of the record generation device 30 generates travel record information of each road (step S108). Subsequently, the record generation device 30 transmits the vehicle speed information, the sensor performance information, and the date information included in the probe information to the guidance information generation device 90 together with the generated travel record (step S110). The travel record information may be transmitted to the positioning device 10, for example, and an image indicating the travel record information may be displayed on the display unit 28 of the positioning device 10. The image indicating the travel record information is an image in which a traveling state of the positioning device 10 is displayed on a map, for example.

Subsequently, the guidance information generation device 90 acquires the weather disaster information of a region including a point indicated by the travel record information from the weather disaster information 42 of the weather information management device 40, the weather disaster information being acquired on the date indicated by the date information received from the record generation device 30 (step S112). Moreover, the guidance information generation device 90 creates correlation data on the basis of the acquired information and stores the correlation data in the correlation data DB 88 (step S114). Subsequently, the guidance information generation device 90 acquires the weather disaster information on the route generated by the route generation unit 92 from the weather disaster information 42 and derives a recommended speed on the route in which the sensor performance is lower than a predetermined level by referring to the correlation data DB 88 on the basis of the acquired weather disaster information to generate guidance information (step S116). Moreover, the guidance information generation device 90 transmits the generated guidance information to the positioning device 10 (step S118). In this way, the processes of one routine of this flowchart end.

Moreover, the reflection unit 26 of the positioning device 10 reflects the traffic information and the guidance information in the map information 29. For example, the reflection unit 26 correlates the traffic information and the guidance information with the map information 29 (links or the like). Moreover, a navigation device may be mounted on the vehicle and the navigation device may use the map information 29. The navigation device determines a route to a destination designated by an occupant from the position (or an arbitrary input position) of the subject vehicle M by referring to the map information 28. The navigation device performs route guidance using the display unit 29 on the basis of the determined route. In this case, the navigation device provides guidance on a recommended speed on the route, presents a bypass route, and guides to a bypass route.

The guidance information generation unit 94 may store the same information as the map information 29 in the guidance information generation device 90 and reflect the guidance information in the map information 4. In this case, the guidance information generation unit 94 generates guidance information for avoiding a place where the sensor performance is lower than a predetermined level on the level of a road lane. The guidance information is transmitted to the vehicle in correlation with the route calculated by the route generation unit 92. A route to a destination and guidance that avoids a place on the route where the sensor performance is lower than a predetermined level are displayed on the display unit of the vehicle.

Figure 6:
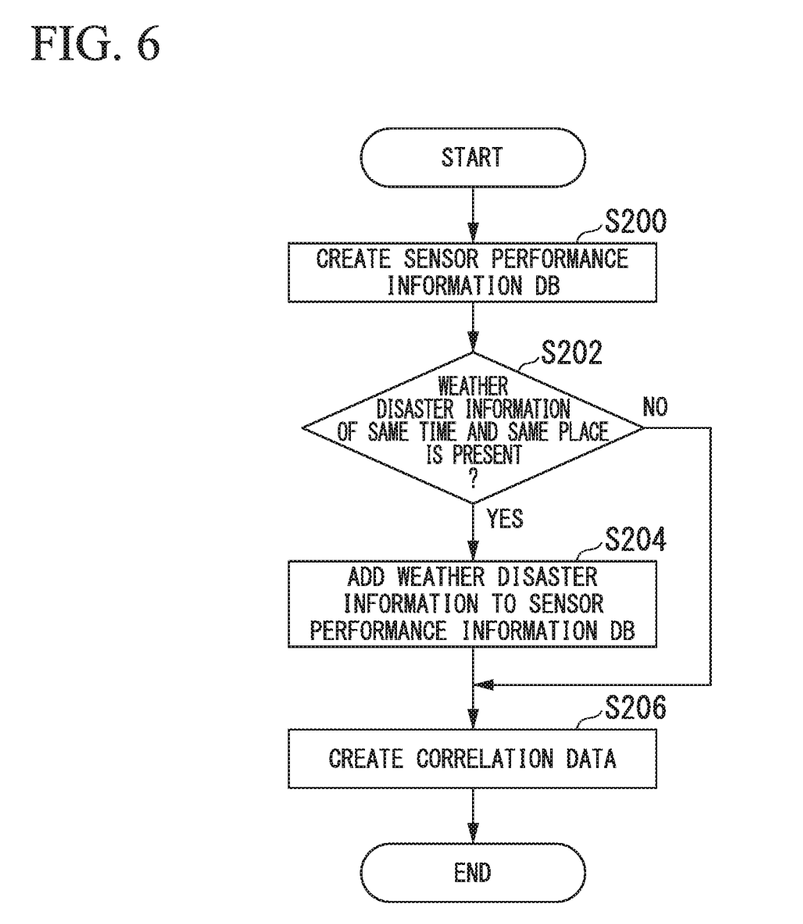
FIG. 6 is a flowchart illustrating a process for creating correlation data.
Figure 7:
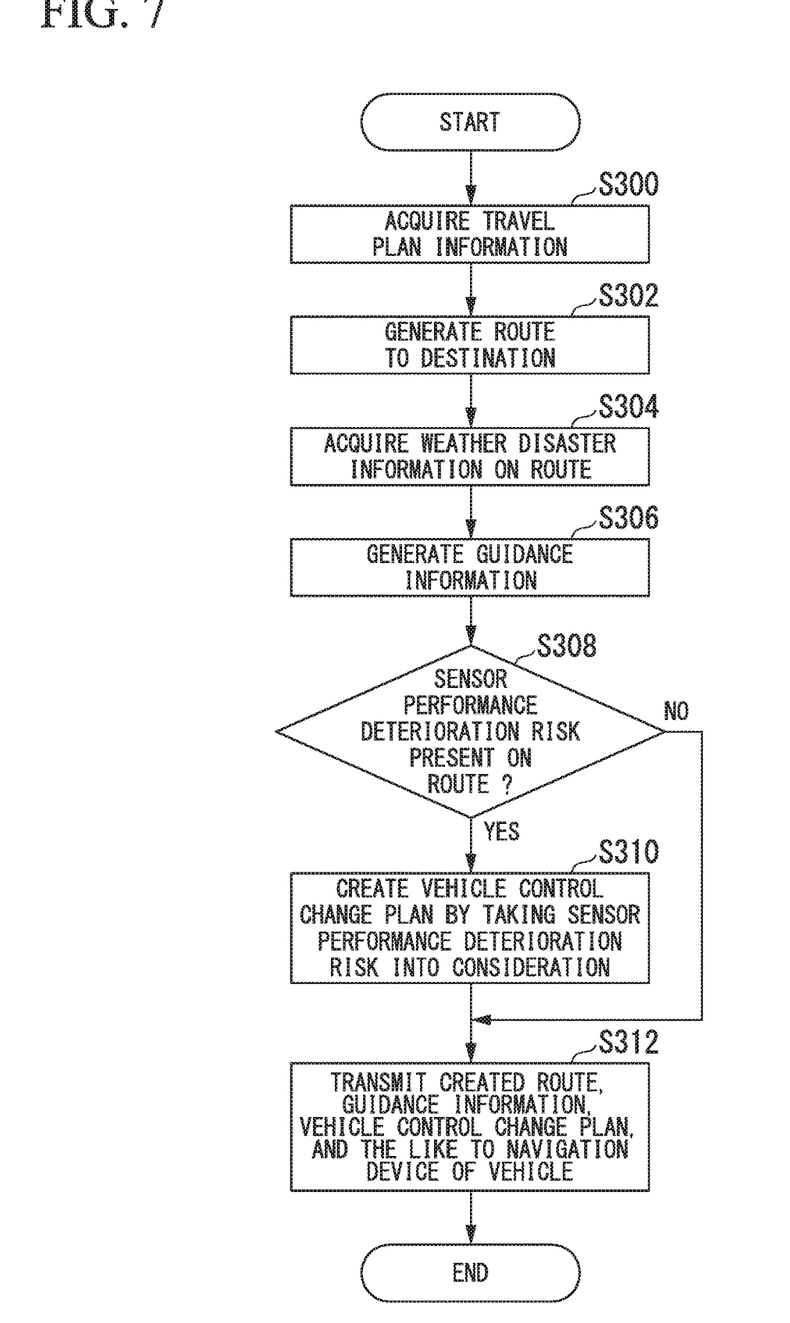
FIG. 7 is a flowchart illustrating a process for generating guidance information by referring to correlation data.

Next, processes executed by the guidance information generation device 90 will be described with reference to FIGS. 6 and 7. FIG. 6 is a flowchart illustrating a process for creating correlation data and FIG. 7 is a flowchart illustrating a process for generating guidance information by referring to the correlation data.

First, the flowchart illustrated in FIG. 6 will be described. First, the acquisition unit 82 receives the travel record information, the vehicle speed information, the sensor performance information, and the date information from the record generation device 30 and stores these items of information in the sensor performance information DB 84 in correlation (step S200). Moreover, the acquisition unit 82 determines whether the weather disaster information of a region including a point indicated by the travel record information, the weather disaster information being acquired on the date indicated by the date information is stored in the weather disaster information 42 of the weather information management device 40 (step S202). When the weather disaster information of a region including a point indicated by the travel record information, the weather disaster information being acquired on the date indicated by the date information is stored in the weather disaster information 42, the acquisition unit 82 acquires the weather disaster information from the weather disaster information 42 and stores the weather disaster information in the sensor performance information DB 84 in correlation with the travel record information and the like (step S204). Subsequently, the database creation unit 86 creates the correlation data on the basis of the information read from the sensor performance information DB 84 and updates the correlation data DB 88 (step S206).

Next, the flowchart illustrated in FIG. 7 will be described. First, the route generation unit 92 acquires the travel plan information transmitted from the navigation device of the user, for example, (step S300) and generates a route to the destination on the basis of the acquired travel plan information (step S302). Subsequently, the guidance information generation unit 94 acquires the weather disaster information on the route generated by the route generation unit 92 from the weather disaster information 42 (step S304) and creates the guidance information corresponding to the route (step S306). Moreover, the guidance information generation unit 94 determines whether a place (that is, a sensor performance deterioration risk) where the sensor performance is lower than a predetermined level is present on a route by referring to the correlation data DB 88 on the basis of the weather disaster information acquired in step S304 (step S308). When it is determined that there is a sensor performance deterioration risk, the guidance information generation unit 94 creates a vehicle control change plan by taking the sensor performance deterioration risk into consideration (step S310). The guidance information generation unit 94 transmits the created route, the guidance information, and the vehicle control change plan to the navigation device of the vehicle (step S312).

According to the above-described embodiment, the information processing system includes the acquisition unit 82 that acquires the position information indicating the position of a vehicle, the sensor performance information which is information on the performance of sensors mounted on the vehicle, the weather information corresponding to the position of the vehicle, and the vehicle speed information detected by the sensor mounted on the vehicle and the database creation unit 86 that creates the correlation data indicating at least one of the correlation between the weather information and the sensor performance information and the correlation between the weather information and the vehicle speed information on the basis of the information acquired by the acquisition unit 82. Therefore, it is possible to provide information that enables comfortable driving even under bad weather conditions.

While aspects for carrying out the present invention have been described using embodiments, the present invention is not limited to these embodiments, and various changes and substitutions can be made without departing from the spirit of the present invention.

What is claimed is:

1. An information processing system comprising:
   an acquisition unit configured to acquire position information indicating a position of a vehicle, sensor performance information indicating the performance of a sensor mounted on the vehicle, and weather information corresponding to the position of the vehicle; and
   a database creation unit configured to create correlation data indicating a correlation between the weather information and the sensor performance information on the basis of the information acquired by the acquisition unit.

2. The information processing system according to claim 1, wherein
   the correlation data is at least data indicating a correlation between weather information that satisfies a performance deterioration weather condition determined in advance as a weather condition for which deterioration in the performance of the sensor is predicted and sensor performance information corresponding to weather that satisfies the performance deterioration weather condition.

3. The information processing system according to claim 1, further comprising:
   a route generation unit configured to generate a route to a destination; and
   a guidance information generation unit configured to generate guidance information corresponding to the performance of the sensor by referring to the correlation data on the basis of the weather information on the route generated by the route generation unit when a place that satisfies a performance deterioration weather condition determined in advance as a weather condition for which deterioration in the performance of the sensor is predicted is present on the route generated by the route generation unit.

4. The information processing system according to claim 3, further comprising:
   a display control unit configured to generate an image to be displayed on a display unit on the basis of the guidance information created by the guidance information generation unit and cause the generated image to be displayed on the display unit.

5. The information processing system according to claim 4, wherein
the display control unit causes the generated image to be displayed on a display unit provided in the vehicle or a display unit of a mobile terminal.

6. An information processing system comprising:
an acquisition unit configured to acquire position information indicating a position of a vehicle, vehicle speed information detected by a sensor mounted on the vehicle, and weather information corresponding to the position of the vehicle; and
a database creation unit configured to create correlation data indicating a correlation between the weather information and information based on the vehicle speed information on the basis of the information acquired by the acquisition unit.

7. The information processing system according to claim 6, wherein
the correlation data is at least data indicating a correlation between weather information that satisfies a performance deterioration weather condition determined in advance as a weather condition for which deterioration in the performance of the sensor is predicted and information based on a vehicle speed corresponding to weather that satisfies the performance deterioration weather condition.

8. The information processing system according to claim 7, wherein
the acquisition unit further acquires sensor performance information indicating the performance of the sensor mounted on the vehicle, and
the database creation unit determines sensor performance information that satisfies a predetermined reference condition as reference sensor performance information within the sensor performance information acquired by the acquisition unit and creates the correlation data by learning a correlation between the weather condition and the vehicle speed information detected when sensor performance information of which the performance of the sensor is lower than the reference sensor performance information is acquired.

9. The information processing system according to claim 6, further comprising:
a route generation unit configured to generate a route to a destination; and
a guidance information generation unit configured to generate guidance information including a recommended speed on the route by referring to the correlation data on the basis of the weather information on the route generated by the route generation unit when a place that satisfies a performance deterioration weather condition determined in advance as a weather condition for which deterioration in the performance of the sensor is predicted is present on the route generated by the route generation unit.

10. An information processing method for causing a computer to execute:
acquiring position information indicating a position of a vehicle, sensor performance information indicating the performance of a sensor mounted on the vehicle, and weather information corresponding to the position of the vehicle; and
creating correlation data indicating a correlation between the weather information and the sensor performance information on the basis of the acquired information.

11. An information processing method for causing a computer to execute:
acquiring position information indicating a position of a vehicle, vehicle speed information detected by a sensor mounted on the vehicle, and weather information corresponding to the position of the vehicle; and
creating correlation data indicating a correlation between the weather information and information based on the vehicle speed information on the basis of the acquired information.

\* \* \* \* \*